United States Patent [19]

Plesniarski

[11] Patent Number: 4,822,104

[45] Date of Patent: Apr. 18, 1989

[54] SEAT BELT BUCKLE FOR CHILD RESTRAINT

[75] Inventor: Edward J. Plesniarski, Warren, Mich.

[73] Assignee: General Motors Corporation, Detroit, Mich.

[21] Appl. No.: 155,954

[22] Filed: Feb. 16, 1988

[51] Int. Cl.[4] ............................................. A47C 31/00
[52] U.S. Cl. ..................................... 297/468; 24/630; 297/250; 297/482
[58] Field of Search ................. 24/630, 633, 631, 632, 24/574, 697; 297/468, 482, 250; 280/801

[56] References Cited

U.S. PATENT DOCUMENTS

| | | | |
|---|---|---|---|
| 3,600,768 | 8/1971 | Romanzi | 24/574 |
| 3,673,645 | 7/1972 | Burleigh | 24/630 |
| 4,611,854 | 9/1986 | Pfeiffer | 297/468 |
| 4,685,740 | 8/1987 | Föhl | 297/468 |
| 4,758,048 | 7/1988 | Shuman | 297/468 |

FOREIGN PATENT DOCUMENTS 2537534  3/1976  Fed. Rep. of Germany ...... 280/801

Primary Examiner—James R. Brittain
Attorney, Agent, or Firm—Charles E. Leahy

[57] ABSTRACT

A seat belt buckle assembly is provided for alternate engagement by either a seat belt latch plate of a seat belt for restraining an adult occupant upon the occupant seat, or by a hook mounted on the end of an auxiliary child restraint belt to restrain a child seat upon the occupant seat. The seat belt buckle comprises a housing having a slot receiving an anchor belt passing therethrough to mount the buckle on the vehicle. The buckle has a conventional push button operated latch arrangement adapted to latchingly receive the latch plate connected to the adult restraint belt. In addition, an anchor plate having an aperture therethrough for receiving the hook of a child seat restraint belt is provided and has a slot which also receives the anchor belt passing through the slot of the buckle whereby the anchor plate is effectively coupled to the buckle by the anchor belt and the anchor belt is effective to alternately connect the seat belt latch plate or the child restraint belt with the vehicle.

2 Claims, 1 Drawing Sheet

SEAT BELT BUCKLE FOR CHILD RESTRAINT

The invention relates to a seat belt buckle particularly adapted to receive either a latch plate connected to an occupant restraint belt or receive a hook mounted on the end of a child seat restraint belt to restrain a child seat on the occupant seat.

BACKGROUND OF THE INVENTION

It is known in motor vehicles to provide an auxiliary restraint belt for the purpose of restraining a child seat upon the vehicle occupant seat. One such auxiliary restraint belt has a latch plate mounted on the end thereof and adapted to latch into the conventional seat belt buckle which is mounted on the vehicle for receiving the adult restraint belt. However, because different vehicles are equipped with buckles made to differing specifications by different manufacturers, the auxiliary restraint belt for the child seat must have a latch plate which is configured to mate with the buckle of the particular vehicle. This leads to a proliferation of the child restraint belts as each must have a latch plate for fitting into the buckle of the particular vehicle.

It is also known to provide a child restraint belt having a hook mounted on the end thereof and adapted to snap into an aperture provided in a mounting bracket mounted on the vehicle. However, the use of such a belt having a hook on the end thereof necessitates the separate mounting of an apertured mounting bracket on the motor vehicle, either as standard equipment by the auto manufacturer or as an aftermarket installation by the vehicle user who wishes to restrain the child seat.

It would be desirable to provide an improved seat belt buckle assembly which could receive either a latch plate of the adult restraint belt or could receive a hook mounted on the end of a child restraint belt.

SUMMARY OF THE INVENTION

According to the present invention a seat belt buckle assembly is provided for alternate engagement by either a seat belt latch plate of a seat belt for restraining an adult occupant upon the occupant seat, or by a hook mounted on the end of an auxiliary child restraint belt to restrain a child seat upon the occupant seat. The seat belt buckle comprises a housing having a slot receiving an anchor belt passing therethrough to mount the buckle on the vehicle. The buckle has a conventional push button operated latch arrangement adapted to latchingly receive the latch plate connected to the adult restraint belt. In addition, an anchor plate having an aperture therethrough for receiving the hook of a child seat restraint belt is provided and has a slot which also receives the anchor belt passing through the slot of the buckle whereby the anchor plate is effectively coupled to the buckle by the anchor belt and the anchor belt is effective to alternately connect the seat belt latch plate or the child restraint belt with the vehicle.

Accordingly, the object, feature and advantage of the invention resides in the provision of a seat belt buckle having a conventional push button type latch for receiving the apertured latch plate carried by the adult restraint belt, and also includes an apertured bracket adapted to receive a hook mounted on the end of the child seat restraint belt.

DESCRIPTION OF THE PREFERRED EMBODIMENT

Figure 1:
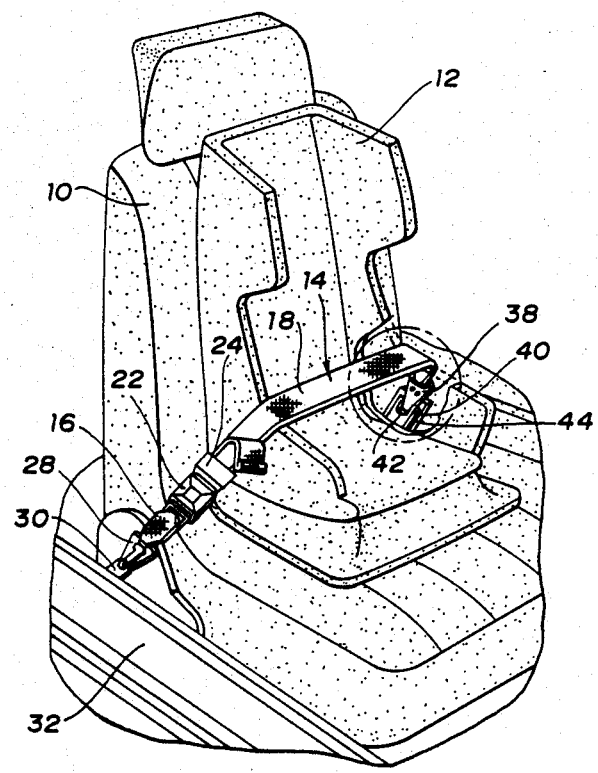
FIG. 1 is a perspective view of a vehicle seat showing an auxiliary restraint belt restraining the child seat upon the occupant seat.

Referring to FIG. 1, there is shown a vehicle occupant seat 10 and a child seat 12. The child seat 12 is removably positioned upon the seat 10 and is restrained thereon by an auxiliary child restraint belt assembly generally indicated at 14. The child restraint belt assembly 14 includes an outboard portion 16 and inboard portion 18 which are coupled together by a push button buckle 22 mounted on the outboard portion 16 and a latch plate 24 mounted on the inboard portion 18. Latch plate 24 snaps into the buckle 22 as shown in FIG. 1 and may be released therefrom by depressing the button of the push button buckle 22. As seen in FIG. 1, the outboard end of the outboard belt portion 16 carries a hook 28 which snaps into an apertured mounting bracket 30 suitably mounted on the rocker panel 32. The hook 28 may be removably detached from the anchor plate 30 on those occasions when it is desired to remove the child restraint belt assembly 14 from the vehicle. Again referring to FIG. 1, it is seen that the inboard end of the inboard belt portion 18 is connected to the vehicle body by a hook member 38 which hooks into anchor plate 40.

Figure 2:
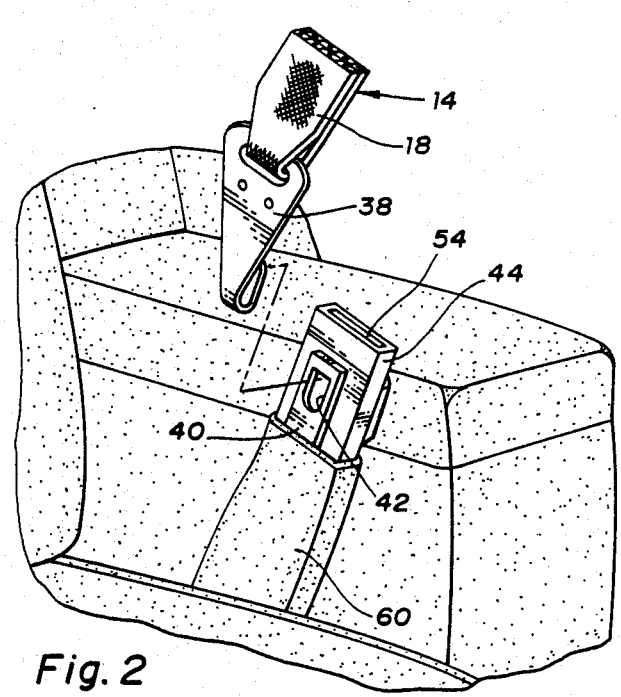
FIG. 2 is an enlarged fragmentary view showing the hook on the end of the child restraint belt adapted for engagement through an apertured anchor plate carried by the seat belt buckle.
Figure 3:
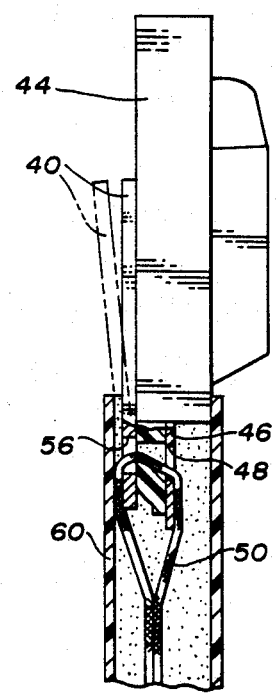
FIG. 3 is a sectional view showing that the anchor belt anchoring the buckle upon the vehicle also anchors the anchor plate and mounts the anchor plate in unitary mounting relationship with the buckle.

As best seen in FIGS. 2 and 3, the anchor plate 40 is a generally planar plate of rectangular configuration and having an aperture 42 for receiving the hook 38. Furthermore, the anchor plate 40 is mounted in conjunction with the seat belt buckle 44. The seat belt buckle 44 is comprised of a housing 46 having a slot 48 which receives an anchor belt 50 conventionally attached to the vehicle body by a mounting bracket, now shown. The anchor belt 50 passes through the slot 48 and is sewn to itself so that the anchor belt effectively mounts the buckle 44 on the vehicle body. The buckle 44 also has a opening 54 in the end thereof which receives the latch plate connected to the end of the adult restraint belt, not shown. The conventional push button operated latch assembly mounted inside the buckle 44 latches the latch plate upon its insertion into the buckle opening 54.

Referring again to FIG. 3, it is seen that the anchor plate 40 has a belt slot 56 through which the anchor belt 50 also passes so that the anchor plate 40 is mounted in unison with the buckle 44 by the anchor belt 50. As best seen in FIG. 3, the plastic seat belt sleeve 60 encloses the anchor belt 50 and engages with the buckle 44 and the anchor plate 40. The plastic sleeve supports the buckle buckle 44 and anchor plate 40 at a convenient height adjacent the occupant hip and also effectively positions the anchor plate 40 in close fitting compact relation with the buckle 44 in a yieldable manner by which the anchor plate 40 may be pivoted away from the buckle 44 in order to receive the hook 38 of the child restraint belt assembly 18.

Figure 4:
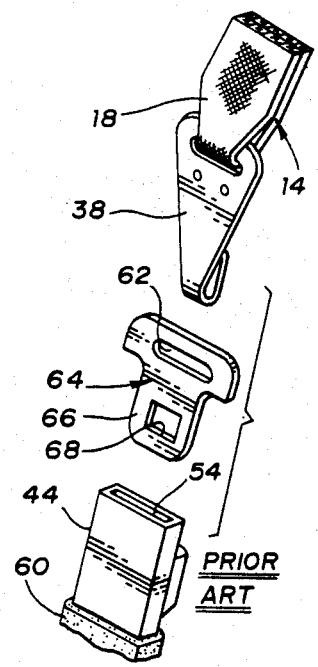
FIG. 4 shows a prior art arrangement for connecting the child restraint belt hook with the seat belt buckle.

FIG. 4 shows the prior art device for connecting the hook 38 of the child restraint buckle assembly 18 with the seat belt buckle 44. In particular, it is seen that an auxiliary latch plate member 64 is provided having a slot 62 for receiving the hook 38. The latch plate 64 also has a latch tongue 66 apertured at 68 for engagement by the latch assembly of the buckle 44. The shortcoming of the arrangement shown in FIG. 4 is that the auxiliary latch plate 64 must be custom configured to have a tongue 66, an aperture 68 which are dimensioned to fit with the buckle 44.

In contrast, the seat belt buckle of this invention, and as shown in FIGS. 2 and 3, has the anchor plate 40 which is provided in unitary mounted relationship with the buckle and adapted for retaining the hook 38 of the child restraint belt assembly 18.

It will be understood that the anchor plate 40 need not be a stamping as shown herein, but could be a ring or loop of cable or some other device adapted to receive the hook. For example, the hook device could be a headed pin, and the anchor plate 40 could have a keyhole shaped aperture to detachably receive the headed pin.

Thus it is seen that the invention provides a new and improved buckle assembly for alternately receiving either the latch plate of the conventional adult seat belt assembly or a hook connected to an auxiliary child restraint belt.

I claim:

1. In a motor vehicle occupant restraint system of the type wherein a belt is mounted on the vehicle on one side of an occupant seat and carries a latch plate, a buckle is mounted on the vehicle on the other side of the occupant seat by an anchor belt extending through a slot in the buckle housing and is engageable by the latch plate to restrain the occupant in the vehicle seat, and a child seat is adapted to sit on the occupant seat and a child restraint belt is connected to the vehicle on the one side of the occupant seat, the improvement comprising:

a hook attached to the child restraint belt;

and an anchor plate independent of the buckle and having a slot receiving the anchor belt passing through the slot of the buckle housing whereby the anchor plate is effectively coupled to the buckle by the anchor belt, and said anchor plate having an aperture therein for receiving the hook of the child restraint belt to connect the child restraint belt with the vehicle and thereby restrain the child seat on the occupant seat.

2. In a motor vehicle occupant restraint system of the type wherein a belt is mounted on the vehicle on one side of an occupant seat and carries a latch plate, a buckle is mounted on the vehicle on the other side of the occupant seat by an anchor belt extending through a slot in the buckle housing and is engageable by the latch plate to restrain the occupant in the occupant seat, and a child seat is adapted to sit on the occupant seat and a child restraint belt is connected to the vehicle on the one side of the occupant seat, the improvement comprising:

a hook attached to the child restraint belt;

and an anchor plate having a slot receiving the anchor belt passing through the slot of the buckle whereby the anchor plate is effectively coupled to the buckle by the anchor belt, and said anchor plate having an aperture therein for receiving the hook of the child restraint belt to connect the child restraint belt with the vehicle and thereby restrain the child seat on the occupant seat;

and a molded plastic sleeve enclosing the anchor belt and yieldably supporting the the buckle and the anchor plate adjacent to the occupant seat and yieldably engaging the buckle housing and the anchor plate to position the anchor plate in a normal compact close fitting relationship with the buckle housing and yieldably permitting the anchor plate to pivot away from the buckle housing for engagement by the hook of the child restraint belt.

* * * * *